No. 699,939. Patented May 13, 1902.
C. H. WOODRUFF.
ADJUSTABLE DESK AND SEAT.
(Application filed Nov. 18, 1901.)
(No Model.)
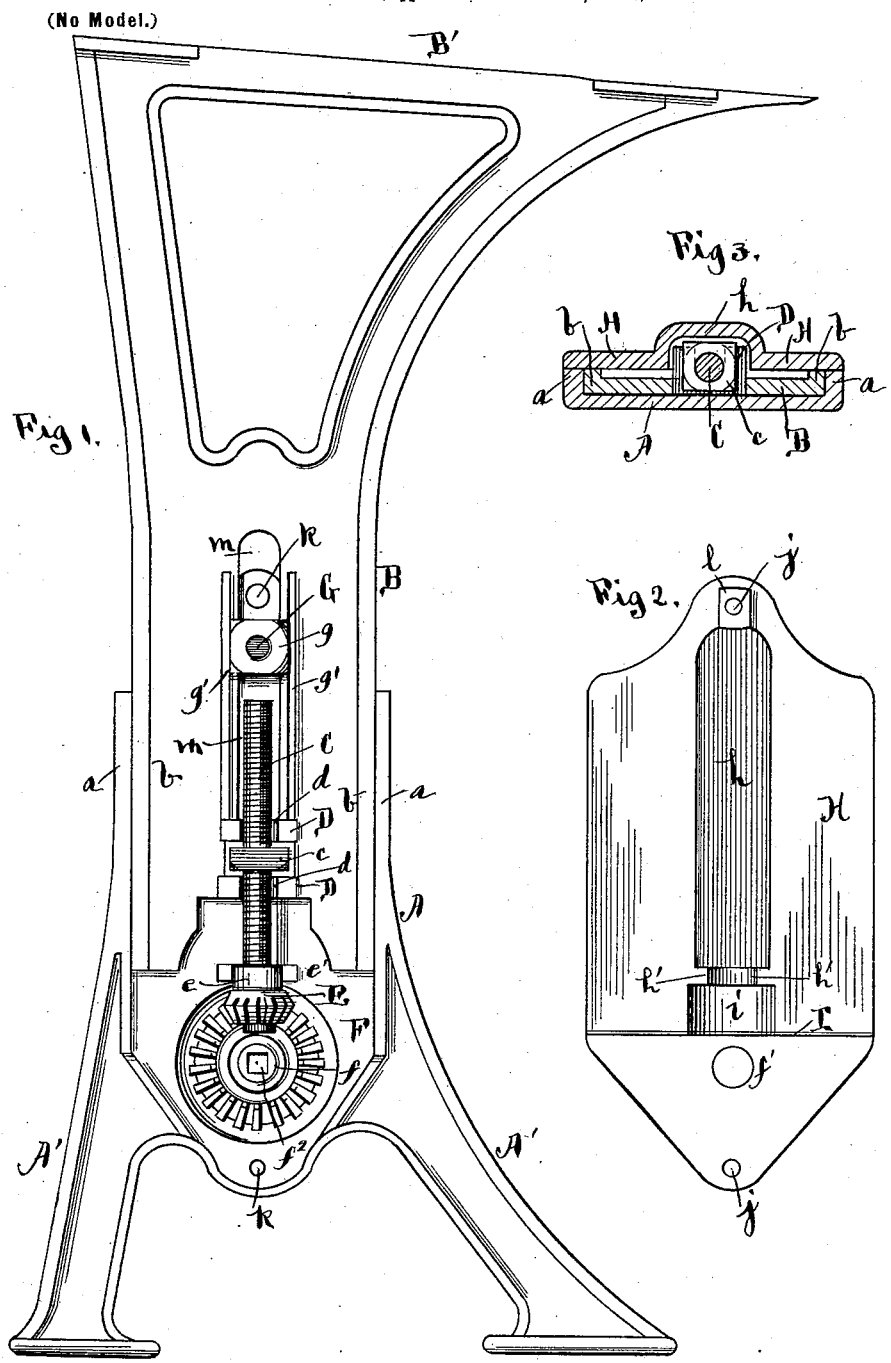

UNITED STATES PATENT OFFICE.

CHARLES H. WOODRUFF, OF ELGIN, ILLINOIS, ASSIGNOR TO WOODRUFF & EDWARDS COMPANY, OF ELGIN, ILLINOIS, A CORPORATION OF ILLINOIS.

ADJUSTABLE DESK AND SEAT.

SPECIFICATION forming part of Letters Patent No. 699,939, dated May 13, 1902.

Application filed November 18, 1901. Serial No. 82,689. (No model.)

*To all whom it may concern:*

Be it known that I, CHARLES H. WOODRUFF, a citizen of the United States, residing at Elgin, in the county of Kane and State of Illinois, have invented a certain new and useful Improvement in Adjustable Desks and Seats, of which the following is a specification.

This invention relates to school desks and seats of that type in which the desk proper and the seat can be raised and lowered, and thereby be properly adjusted for the convenience of the pupil using the desk and seat, thus enabling desks and seats of the same general character to be used for both large and small pupils.

The object of the invention is to construct and apply to the divided standard or support of the desk a positively-acting threaded stem or screw by means of which the movable section or division of the standard or support can be raised and lowered, to enable the threaded stem or screw to be readily actuated by the proper party and when the required adjustment is reached have the threaded stem or screw self-locked by its operating means in the adjusted position, and to improve generally the construction of the divided standard or support and the operation of the devices by which the movable section or division of the standard or support is raised and lowered; and the invention consists in the features of construction and combination of parts hereinafter described and claimed.

For illustrative purposes the threaded stem or screw and its operating means are shown only in connection with a desk standard or support for raising the desk; but in actual practice a duplicate of the threaded stem or screw and its operating means is to be located on the fixed section or division of the standard or support in suitable relation for raising and lowering the seat.

In the drawings, Figure 1 is a side elevation of the inner face of a divided standard or support with the cap or cover over the threaded stem or screw and its operating means detached; Fig. 2, an inner face view of the cap or cover for the threaded stem or screw and its actuating-gears, and Fig. 3 a cross-section through the standard and the cap or cover on line 3 of Fig. 1.

The standard or support is a divided one, having a fixed or lower section or division A with extensions or legs A' for attachment to the floor, as usual, and a movable or upper section or division slidable in or on the lower section or division and having an upper face for securing thereto the desk in any usual and well-known manner, the desk being of any well-known form, and a divided standard or support is used for each end of the desk, as usual.

The straight portion or main body of the fixed or lower section A of each standard has side flanges $a$, between which is located the straight portion or main body of the movable or upper section or division B, and, as shown, the movable section or division B also has edge flanges $b$, giving an increased strength at the union of the two sections or divisions where the movable section or division enters the fixed section or division.

A threaded stem or lifting-screw C, having a traveling nut $c$, has its body entered into recesses $d$ in lugs or stops D, between which the nut $c$ is located, so that with the turning of the threaded stem or lifting-screw the nut will operate against one or the other of the lugs or stops D, which are permanent with the movable section or division B of the standard or support, and operate to raise and lower such movable section or division, the turning of the threaded stem or screw in one direction operating to raise the movable section or division and a reverse turning of the threaded stem or screw operating to lower the movable section or division, which travels on the face of the fixed section or division between the flanges $a$, giving the movable section or division a straight-line travel in raising and lowering. The lower end of the threaded stem or screw has fixed thereto a bevel-pinion E, the hub of which rests in a recess therefor in a lug or projection $e'$ on the fixed section or division of the standard or support, and, as shown, the lower end of the movable section or standard is cut away so as to leave a clear space for the lowering of the section or standard to the limit of the longitudinal slot of the movable or upper section or division. The bevel-pinion E meshes with a bevel-gear F, the hub $f$ of which on one side has a bearing in the body of the lower section or division of the standard or support, and this hub has therein in the arrangement shown a square hole $f^2$ for the reception of a turn-key of a crank or handle, by means of which the bevel-gear F can be revolved in either direction to impart rotation to the bevel-pinion and actuate the threaded stem or lifting-screw for raising and lowering the movable section or division of the standard or support.

A bolt G has its stem or body passing through the upper end of the lower or fixed section or division of the standard or support and receives on its end a nut $g$, which lies between two ribs $g'$ on the face of the movable or upper section or division of the standard or support, so that the nut and the ribs serve as a guiding means in addition to the side flanges $a$ for insuring a direct-line movement in raising and lowering the movable or upper section or division of the standard or support.

The threaded stem or lifting-screw C and the operating-gears E and F are covered by a cap or cover H of a width corresponding to the width of the main portion or body of the fixed or lower section of the standard or support, and this cover has a central longitudinal depression $h$ to fit over the threaded stem or lifting-screw and its nut, permitting the travel of the nut up and down on the threaded stem or screw in use, and a smaller depression $h'$ is provided to fit over the lug $e$ of the bevel-pinion and form with the lug or projection $e'$ a bearing for the hub. As shown, the cap or cover has a ledge or shelf I at its lower end, which forms a step or bearing for the lower end of the threaded stem or lifting-screw when the cap or cover is in place, and adjacent to the ledge or shelf is a depression $i$ to receive the bevel-pinion E, furnishing a sufficient clearance for the rotation of the pinion, and in the plate or cover, below and adjacent to the shelf or ledge, is a hole $f'$, forming a bearing for the end of the hub $f$ of the bevel-gear. The cap or cover is firmly secured in place by suitable screw-bolts (not shown) passing through holes $j$ in the cap or cover and holes $k$ in the body of the fixed or lower section or division of the standard, and, as shown, the upper end of the cap or cover has a lug $l$, which enters a slot $m$ in the movable or upper section or division of the standard or support, which slot is for the passage of the guide and fastening bolt G and permits the raising and lowering of the movable section or division of the standard or support.

The parts are assembled by placing the lower end of the movable section or division of the standard or support between the flanges $a$ of the fixed section or division of the standard or support, passing the bolt G through the section or division A of the standard or support and entering its screw-threaded end into the nut $g$ between the ribs $g'$ on the section or division B of the standard or support, inserting the gear F in the depression therefor in the lower or fixed section of the standard or support for its hub to enter the bearing therefor, dropping the threaded stem or lifting-screw, with the bevel-pinion thereon, into position for the pinion to mesh with the gear F and the nut $c$ to lie between the lugs or stops D, placing the cover H over the threaded stem or lifting-screw, and the gears for the end of the threaded stem or screw to rest on the ledge or shelf I with the bevel-pinion in the depression $i$, and then securing the cover in place by screw-bolts (not shown) or otherwise, which completes the assembling of the parts ready for use. In use the turning of the bevel-gear F by a suitable turn-key on a crank or handle entered into the square opening $f^2$ operates the bevel-pinion to rotate the threaded stem or lifting-screw for such rotation to actuate the traveling nut and through the lugs or stops D raise and lower the movable or upper section or division of the standard or support, according to the direction of the turning of the threaded stem or lifting-screw, and when the movable or upper section or division of the standard or support is raised or lowered to be at the height required for the desk the operating crank or handle is withdrawn from the square opening, leaving the parts locked in the adjusted position and so remaining until the bevel gear and pinion are again operated by inserting the turn-key of the crank or handle.

The threaded stem or lifting-screw, with its traveling nut and the engaging stops or lugs with which the nut coacts, furnish a positively-acting and reliable means for raising and lowering the movable section or division of the standard or support, and the gear and bevel-pinion coacting therewith enable the threaded stem or lifting-screw to be actuated to operate the nut and also furnish a lock for retaining the movable section or division of the standard or support in an adjusted position. The device as a whole is exceedingly simple and is easily operated, and by its use the adjustment of the standard or support and of a seat is quickly, readily, and easily accomplished. The arrangement shown has the operating-gears at the lower end of the threaded stem or lifting-screw; but it is evident that the gears may be located at the upper end of the threaded stem or lifting-screw, in which case the stem or screw will operate to raise or draw up the movable section or division of the standard or support; but otherwise the operation would be the same as the gears at the lower end of the threaded stem or screw.

What I consider as new, and desire to secure by Letters Patent, is—

1. In combination with a divided standard or upright for desks and seats, consisting of a movable section and a fixed section, of a threaded stem or screw operating in free contact with both sections of the standard or support, a traveling nut mounted thereon, lugs or stops on the movable section or division of the standard or support on each side of and in engagement with the traveling nut, a gear connection for turning the threaded stem or screw and actuating the traveling nut, and a cap having therein a longitudinal recess forming a guideway for the traveling nut and preventing the same from turning, substantially as described.

2. The combination of a divided standard or support for adjustable desks and seats, consisting of a movable section supported by and lying in facial contact with a fixed section, a threaded stem or screw having thereon a traveling nut, lugs or stops on the movable section or division of the standard or support in engagement with the traveling nut, a bevel-pinion on the end of the threaded stem or screw, lugs on the fixed section or division furnishing a journal-bearing face for the stem or screw, a bevel-gear mounted in the fixed section or division of the standard or support and in mesh with the bevel-pinion for turning the threaded stem or screw and actuating the traveling nut, and a cap or cover provided with a recess furnishing a journal-bearing face for the stem or screw, substantially as described.

3. The combination with a divided standard or support for adjustable desks and seats, of a threaded stem or screw having thereon a traveling nut, lugs or stops on the movable section or division of the standard or support on each side of and in engagement with the traveling nut, a bevel-pinion on the end of the threaded stem or screw, and a hub on the stem or screw behind the bevel-pinion, lugs on the fixed section or division forming a journal-bearing face for the hub, a bevel-gear mounted in the fixed section or division of the standard or support and in mesh with the bevel-pinion, and a cap or cover attached to the fixed section or division of the standard or support inclosing the gear and the threaded stem or screw, and having in its body a depressed journal-bearing face for the hub, substantially as described.

4. The combination with a divided standard or support for adjustable desks and seats, of a threaded stem or screw having thereon a traveling nut, lugs or stops on the movable section or division of the standard or support in engagement with the traveling nut, a bevel-pinion on the end of the threaded stem or screw, a bevel-gear mounted in the fixed section or division of the standard or support and in mesh with the bevel-pinion, and a cap or cover attached to the fixed section or division of the standard or support and inclosing the gear and the threaded stem or screw and having a table or shelf furnishing a step for the lower end of the threaded stem or screw, substantially as described.

5. The combination of a divided standard or support for adjustable desks and seats, having a movable upper section or division provided with guide-ribs and a fixed lower section or division, a bolt and nut with the stem of the bolt passing through the fixed section or division of the standard or support, and through a longitudinal slot in the body of the movable section or division of the standard or support with the nut of the bolt entered between guide-ribs of the movable section or division of the standard or support, a threaded stem or screw having thereon a traveling nut, lugs or stops on the movable section or division of the standard or support in engagement with the traveling nut, a bevel-pinion on the end of the threaded stem or screw, a bevel-gear mounted in the fixed section or division of the standard or support and in mesh with the bevel-pinion, and a cap or cover attached to the fixed section or division of the standard or support and inclosing the gear and the threaded stem or screw and having a table or shelf forming a step for the end of the threaded stem or screw, substantially as described.

CHARLES H. WOODRUFF.

Witnesses:
THOMAS A. BANNING,
OSCAR W. BOND.